(12) United States Patent
Hou

(10) Patent No.: US 10,138,326 B2
(45) Date of Patent: Nov. 27, 2018

(54) METHOD OF PRODUCING COPOLYESTER MATERIAL WITH PEPTIDE AND COPOLYESTER MATERIAL WITH PEPTIDE THEREOF

(71) Applicant: Camangi Corporation, Taipei (TW)

(72) Inventor: Erh-Jen Hou, Taipei (TW)

(73) Assignee: Camangi Corporation, Taipei (TW)

(*) Notice: Subject to any disclaimer, the term of this patent is extended or adjusted under 35 U.S.C. 154(b) by 53 days.

(21) Appl. No.: 15/596,011

(22) Filed: May 16, 2017

(65) Prior Publication Data
US 2017/0335052 A1 Nov. 23, 2017

(30) Foreign Application Priority Data
May 17, 2016 (TW) .............................. 105115233 A

(51) Int. Cl.
| | | |
|---|---|---|
| *C08G 63/685* | (2006.01) | |
| *C08G 63/127* | (2006.01) | |
| *C08G 63/85* | (2006.01) | |
| *C08G 63/86* | (2006.01) | |

(52) U.S. Cl.
CPC ......... *C08G 63/685* (2013.01); *C08G 63/127* (2013.01); *C08G 63/6856* (2013.01); *C08G 63/85* (2013.01); *C08G 63/866* (2013.01)

(58) Field of Classification Search
CPC ................ C08G 63/127; C08G 63/685; C08G 63/6856; C08G 63/85; C08G 63/866
See application file for complete search history.

*Primary Examiner* — Robert S Jones
(74) *Attorney, Agent, or Firm* — Alan D. Kamrath; Kamrath IP Lawfirm, P.A.

(57) ABSTRACT

A method of producing copolyester material with peptide and is disclosed. The method includes: putting ethylene glycol, collagen peptide and Benzenedicarboxylic acid into a container, and mixing them to form a mixture; heating the mixture for executing an esterification reaction, to product esters and water; heating the esters to a first temperature, and stirring the esters via a mixer; in a specific period, decreasing the pressure in the container to a first pressure for executing a polycondensation reaction; decreasing the pressure in the container to a second pressure, and stirring the esters via the mixer, to produce a copolyester material with peptide.

17 Claims, 2 Drawing Sheets

| Type | Polyethylene Terephthalate (PET) | Copolyester material with peptide |
|---|---|---|
| Hydrophilicity | 0.4% | 1% |
| Antistaticity (surface impedance) | $> 10^{15} \, \Omega$ | $2.4 \times 10^{12} \, \Omega$ |
| Ductility (dry elongation) | 22% | 30% |

FIG. 2

METHOD OF PRODUCING COPOLYESTER MATERIAL WITH PEPTIDE AND COPOLYESTER MATERIAL WITH PEPTIDE THEREOF

BACKGROUND OF THE INVENTION

1. Field of the Invention

The present invention relates to a method of producing copolyester material with peptide, particularly to a method of producing improved copolyester material with peptide which has excellent hydrophilic, antistaticity, toughness and chemical resistance.

2. Description of the Related Art

Polyethylene Terephthalate (PET) is a widely used copolyester material. PET can be used to spun into fibers for weaving, making clothes, bedding, curtains, sheets and carpets, and can be extruded into films such as photographic film, tapes, videotapes and packaging materials as well. PET can also be blown into a vial, used to replace the glass container to fill tea, soft drinks or fruit juice and other beverages.

Taiwan is originally a major producer of Polyethylene Terephthalate (PET). Over the past decades, as the technology is getting mature and labor is expensive, manufacturers gradually shift production equipment to the mainland China and Southeast Asia, using cheap labor in these areas for mass production, and even selling back the products to the domestic. This results in widespread market competition and unprofitable dilemma.

Accordingly, it is necessary to develop an improved copolyester material having a property better than Polyethylene Terephthalate (PET), such that manufacturers can produce more durable and more competitive products.

SUMMARY OF THE INVENTION

It is an object of the present invention to provide a method of producing improved copolyester material with peptide which has excellent hydrophilicity, antistaticity, toughness and chemical resistance.

To achieve the above objective, a method of producing copolyester material with peptide in the present invention includes: putting ethylene glycol, collagen peptide and Benzenedicarboxylic acid into a container, and mixing them to form a mixture; heating the mixture for executing an esterification reaction, to product esters and water; heating the esters to a first temperature, and stirring the esters via a mixer; in a specific period, decreasing the pressure in the container to a first pressure for executing a polycondensation reaction; decreasing the pressure in the container to a second pressure, and stirring the esters via the mixer, to produce a copolyester material with peptide.

According to an embodiment of the present invention, the method of producing copolyester material with peptide further includes: adding a catalyst to a container.

According to an embodiment of the present invention, the method of producing copolyester material with peptide further includes: introducing nitrogen into the container.

According to an embodiment of the present invention, the method of producing copolyester material with peptide further includes: stirring a mixture via a mixer.

According to an embodiment of the present invention, the step of heating the mixture for executing an esterification reaction, to product esters and water further includes: removing water from the container.

According to an embodiment of the present invention, the method of producing copolyester material with peptide further includes: when the torque detected by the mixer exceeds a specific torque value, the heating and stirring are stopped and the pressure in the container is increased by the second pressure.

According to an embodiment of the present invention, in the mixture, the molar ratio of collagen peptide, ethylene glycol, and Benzenedicarboxylic acid is (0.47-0.60):(0.90-1.10):(1.14-1.26).

According to an embodiment of the present invention, the Benzenedicarboxylic acid is Terephthalic Acid (TPA) or Iso-phthalic Acid (IPA), or a combination of TPA and IPA.

According to an embodiment of the present invention, if the Benzenedicarboxylic acid is a combination of Terephthalic Acid (TPA) and Iso-phthalic Acid (IPA), the molar ratio of TPA and IPA is (1.08-1.14):(0.06-0.12).

According to an embodiment of the present invention, the catalyst is a combination of $Sb_2O_3$ and $TiO_2$.

According to an embodiment of the present invention, the ratio range of PPM concentration between $Sb_2O_3$ and $TiO_2$ in the catalyst is (160-360):(0-60).

According to an embodiment of the present invention, the temperature at which the mixture is heated for executing the esterification reaction ranges from 210° C. to 270° C.

According to an embodiment of the present invention, the first temperature ranges from 260° C. to 280° C.

According to an embodiment of the present invention, the second temperature ranges from 270° C. to 290° C.

According to an embodiment of the present invention, the speed of the mixer stirring the mixture ranges from 180 RPM to 220 RPM.

According to an embodiment of the present invention, when the esters are heated to the first temperature, the speed of the mixer stirring the esters ranges from 130 RPM to 170 RPM.

According to an embodiment of the present invention, when the pressure in the container is decreased to the second pressure, and the ester is heated to the second temperature, the speed of the mixer stirring the esters ranges from 80 RPM to 120 RPM.

According to an embodiment of the present invention, the specific time ranges from 20 min to 40 min.

It is another object of the present invention to provide an improved copolyester material with peptide having excellent hydrophilicity, antistaticity, toughness and chemical resistance.

To achieve the above objective, the copolyester material with peptide in the present invention is produced by the method of producing copolyester material with peptide according to the present invention.

BRIEF DESCRIPTION OF THE DRAWINGS

FIG. 2 is a table showing experimental data between the copolyester material with peptide in an embodiment of the present invention and Polyethylene Terephthalate (PET) in the prior art.

DETAILED DESCRIPTION OF THE PREFERRED EMBODIMENT

Figure 1:
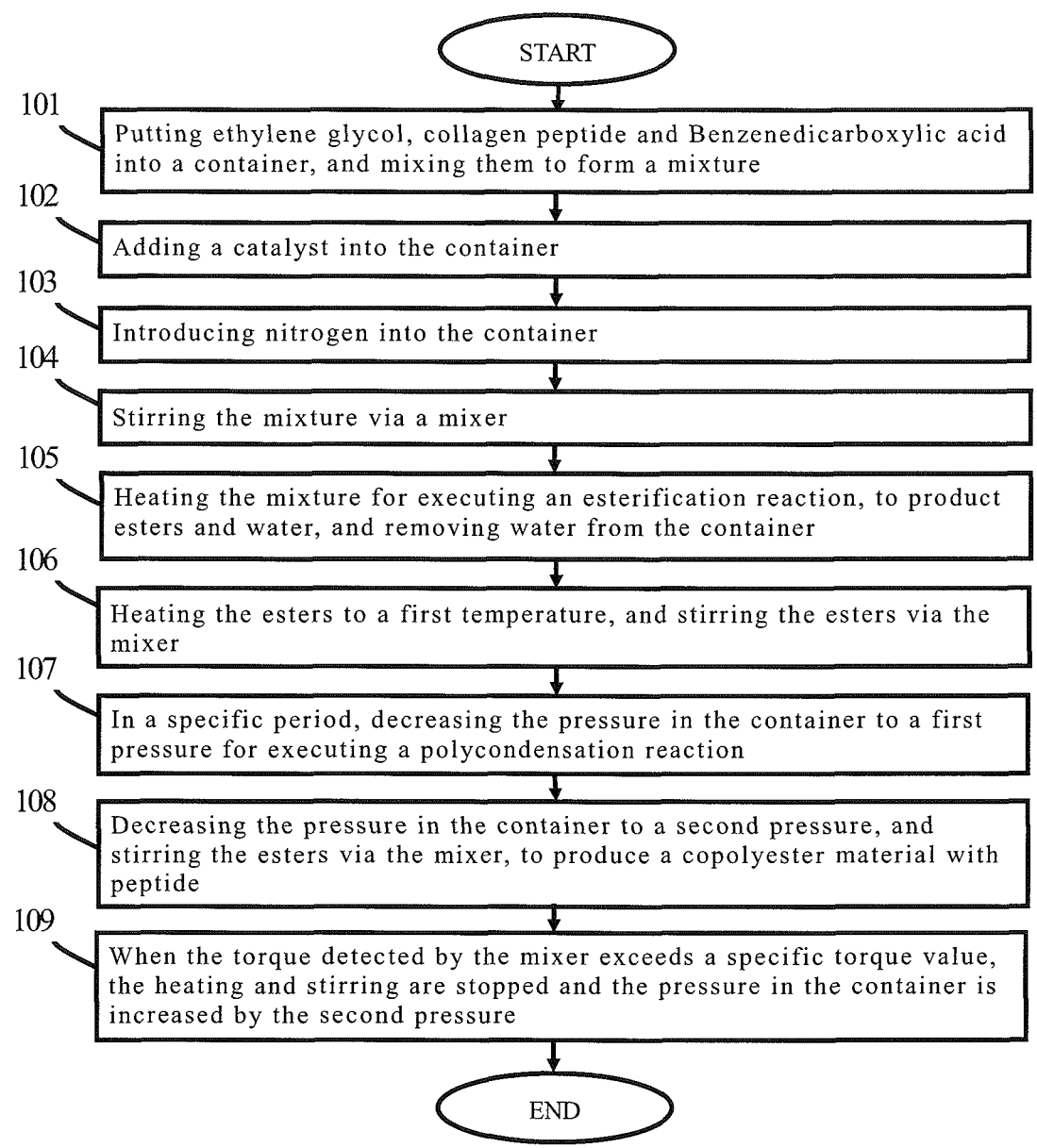
FIG. 1 is a flowchart showing steps of a method of producing copolyester material with peptide according to an embodiment of the present invention.

Hereafter, the technical content of the present invention will be better understood with reference to preferred embodiment.

Hereafter, please refer to both FIG. 1 and FIG. 2 related to a method of producing copolyester material with peptide in an embodiment of the present invention. FIG. 1 is a flowchart showing steps of a method of producing copolyester material with peptide according to an embodiment of the present invention; FIG. 2 is a table showing experimental data between the copolyester material with peptide in an embodiment of the present invention and Polyethylene Terephthalate (PET) in the prior art.

As shown in FIG. 1 and FIG. 2, the method of producing copolyester material with peptide in an embodiment of the present invention is used for producing improved copolyester material. The copolyester material contains peptides and has excellent hydrophilicity, antistaticity, toughness, chemical resistance and ductility. The copolyester material can be processed directly into a variety of products by heat injection or extrusion molding. To implement the method of producing copolyester material with peptide in the present invention, first of all, perform Step 101: Putting ethylene glycol, collagen peptide and Benzenedicarboxylic acid into a container and mixing them to form a mixture.

In an embodiment of the present invention, to produce copolyester material with peptide, the staff must first put ethylene glycol (EG), collagen peptide and Benzenedicarboxylic acid into a container, and make them fully mixed to form a mixture. The Benzenedicarboxylic acid may be Terephthalic Acid (TPA) or Iso-phthalic Acid (IPA), or a combination of TPA and IPA. In an embodiment of the present invention, the type of Benzenedicarboxylic acid is TPA. The container in the present invention is a well-known reaction flask having an accommodating space and a lid that includes a plurality of standard sockets. The accommodating space can accommodate the mixture of the present invention. The standard socket can be connected to other conventional chemical reaction equipment (e.g. a fractionation device, a polycondensation reactor). However, the type of container is not limited to the four-open reaction tank, and it can also be used for other equipment that can be used to contain the mixture to produce copolyester material.

In the mixture according to an embodiment of the present invention, the preferred molar ratio of collagen peptide, ethylene glycol, and Benzenedicarboxylic acid is (0.47-0.60):(0.90-1.10):(1.14-1.26). If the Benzenedicarboxylic acid is a combination of Terephthalic Acid (TPA) and Iso-phthalic Acid (IPA), the molar ratio of TPA and IPA is (1.08-1.14):(0.06-0.12). The collagen peptide in the mixture can adjust the structure of the copolyester material produced by the method according to the present invention, so that the copolyester material becomes non-crystalline and has elasticity, increased water absorption, enhanced hydrophilicity, decreased incidence of static electricity, and increased skin-friendly and ductility, while having heat resistance and toughness to expand the use and value of copolyester materials.

Then, in Step 102: Adding a catalyst to a container.

In an embodiment of the present invention, the staff can add a catalyst to a container to speed up the subsequent reaction rate of the mixture. The catalyst in the present invention is a combination of Antimony Trioxide (Sb2O3) and Titanium Dioxide (TiO2), wherein the ratio range of PPM concentration between Sb2O3 and TiO2 in the catalyst is (160-360):(0-60). However, the type of catalyst is not limited to this, and it can also be a substance that can speed up the subsequent reaction rate of the mixture.

Then, in Step 103: introducing nitrogen into the container.

In an embodiment of the present invention, the staff can introduce nitrogen into the container. Nitrogen can isolate air to stabilize the environment of the esterification reaction that will be executed later. In addition, nitrogen is a dry gas which can remove water produced by the esterification reaction executed later and accelerate breaking the balance of the mixture reaction system to speed up the esterification reaction.

Then, in Step 104: stirring the mixture via a mixer.

In an embodiment of the present invention, the staff puts the container under a known mixer. The mixer includes a stir bar and a torsion detector; the stir bar can agitate the reactants to provide kinetic energy to cause the reactants to accelerate the reaction; the torque detector can detect the torque at which the reactants are stirred to confirm the degree of thickness of the reactants. When the container is under the mixer, the mixer's stir bar will be in the container's accommodating space, where the staff can start the mixer to stir the mixture, which increases the speed of interaction among protein peptide, ethylene glycol and Benzenedicarboxylic acid. The rotational speed of the stir bar is between 180 RPM and 220 RPM, preferably 200 RPM, but the speed is not limited to the above values and can be adjusted according to the product requirements.

Then, in Step 105: heating the mixture for executing an esterification reaction to produce esters and water, and removing water from the container.

While mixing the mixture at the mixer, the staff also heats the mixture in the container to raise the container to a different temperature. In addition, a conventional fractionation device can be connected to a standard socket on the lid of the container to prepare the water produced by the esterification reaction to be distilled from the container. First of all, the container can be heated first, so that the temperature within the container is raised from room temperature to 210° C. At this time, the mixture of collagen peptide, ethylene glycol and Benzenedicarboxylic acid will interact with each other for an esterification reaction to produce esters and by-product water vapor. The fractionation device connected to the standard socket can make the water vapor fractionated from the outside of the container so that the water and esters are separated. In the present embodiment, esters are the Polyethylene Terephthalate (PET) added with the collagen peptide, but the type of the ester is not limited thereto and may vary depending on the ingredients of the mixture. Since both a fractionation equipment and nitrogen can remove the by-product water vapor from the esterification reaction, this can further increase reaction rate of esterification reaction. In addition, the catalyst previously added to the container can also increase the reaction rate of the esterification reaction, and then the temperature of the container can be further raised from room temperature to 260° C., so that the mixture of collagen peptide, ethylene glycol and Benzenedicarboxylic acid in the container can continue with the esterification reaction. After the actual experimental test, the esterification reaction was progressively completed after the temperature was raised to 260° C. and after 5 to 7 hours, the esterification reaction has become completed and will no longer produce esters and by-product water vapor. However, the temperature at which the mixture is heated for executing the esterification reaction is not limited to the above, and the temperature of the heating may range from 210° C. to 270° C. It should be noted that in the esters produced in this step, the molecules of the collagen peptide and Polyethylene Terephthalate (PET) are not bound together. The molecules of collagen peptide and the molecules of Polyethylene Terephthalate (PET) must undergo a further polycondensation reaction before they can be fully bound together.

Then, in Step 106: heating the esters to a first temperature, and stirring the esters via the mixer.

In an embodiment of the present invention, when the esterification reaction is completed, the fractionation device can be removed from the standard socket and an external polycondensation reactor can be connected to the standard socket for subsequent polycondensation reaction. The polycondensation reactor in the present invention is a vacuum system, e.g. a suction pump, which provides a low pressure environment for the esters to execute the polycondensation reaction, such that the Polyethylene Terephthalate (PET) into which the esters with collagen peptide have been added forms a copolyester material having a large molecular weight. The staff needs to heat the esters in the container to the first temperature and stir the esters in the container with the mixer to prepare for the subsequent polycondensation reaction. The first temperature is between 260° C. and 280° C., preferably 270° C. The stirring speed of the mixer is between 130 RPM and 170 RPM, preferably at 150 RPM.

Then, in Step 107: in a specific period, decreasing the pressure in the container to a first pressure for executing a polycondensation reaction.

In an embodiment of the present invention, after the staff heats the esters in the container to the first temperature and adjusts the speed of the mixer, at a specific period of time, the vacuum system of the polycondensation reactor evacuates the container so that the pressure in the container is decreased from the atmospheric pressure (atm) to the first pressure for executing the polycondensation reaction. The specific time ranges from 20 to 40 minutes, preferably 30 minutes, but the range of the specific time is not limited thereto and may vary depending on the needs. The first pressure is 20 torr, but the value of first pressure is not limited thereto and may vary depending on the needs. Since the environment in the container has been warmed up to the first temperature, the esters in the container have been stirred at a specific speed by the mixer and the pressure in the container has been decreased to a low pressure over a specific period of time. Therefore, the esters subject to high temperature, low pressure, and high speed stirring would be affected by the thermal energy, pressure and kinetic energy of the surrounding environment to execute the polycondensation reaction, such that the molecules of collagen peptide and molecules of Polyethylene Terephthalate (PET) are gradually bound together.

Then, in Step 108: decreasing the pressure in the container to a second pressure, and stirring the esters via the mixer, to produce a copolyester material with peptide.

In an embodiment of the present invention, after the pressure in the container drops to the first pressure within a specified time, the staff can use the vacuum system to pump the container so that the pressure in the container is decreased from first pressure to second pressure and the first temperature of the esters is heated to the second temperature. At this time, the staff stirs the esters with a slower speed. The second pressure is 3 torr, but the value of second pressure is not limited thereto and can be changed to a pressure less than 3 torr in accordance with the needs. The second temperature is between 270° C. and 290° C. The preferred second temperature is 280° C., but the range of the second temperature is not limited thereto and may vary depending on the needs. The speed of the rotor is between 80 RPM and 120 RPM, preferably 100 RPM, but the speed is not limited thereto and may vary depending on the needs. Since the environment in the container has been heated from the first temperature to the second temperature, the esters in the container have been stirred by the mixer with the slower specific speed and the pressure in the container has been further decreased to a lower pressure, the esters subject to high temperature, low pressure, and low speed stirring will be affected by thermal energy, pressure and kinetic energy of the surrounding environment to execute the polycondensation reaction, such that the molecules of collagen peptide which are not yet bound together are fully bound to the molecules of Polyethylene Terephthalate (PET) for producing copolyester material with peptide having a larger molecular weight. The collagen peptide combined with Polyethylene Terephthalate (PET) can adjust the structure of the copolyester material, make the copolyester material non-crystalline and elastic, increase the water absorption, reduce the incidence of static electricity, increase skin-friendly, increase ductility, while having both heat resistance and toughness to expand the use and value of copolyester materials.

Finally, in Step 109: When the torque detected by the mixer exceeds a specific torque value, the heating and stirring are stopped and the pressure in the container is increased by the second pressure.

In an embodiment of the present invention, when the torque detector of the mixer detects that the torque value when stirring the ester exceeds a specific value, it means that the ester has been completely polymerized into a thick copolyester material with peptide. At this time, the staff can stop heating the container so that the mixer stops the operation and restores the pressure in the container from the low pressure second pressure to the normal chamber pressure (1 atm), and then remove the copolyester material with peptide for other processing, e.g. heat injection or extrusion molding, to manufacture a variety of products. The specific torque value in this embodiment is 2.0 kg-cm, but the specific torque value is not limited thereto and may vary depending on the use needs.

As shown in FIG. 2, it can be found from the experimental test that the hydrophilicity of the copolyester material with peptide produced by the method according to the present invention is 1%, the antistaticity (surface impedance) is about $2.4 \times 10^{12}\Omega$ which can effectively conduct static electricity to prevent electrostatic accumulation on the surface of copolyester material with peptide, and the ductility is 30%; and the hydrophilicity of conventional Polyethylene Terephthalate (PET) is 0.4%, and the antistaticity (surface impedance) is greater than $10^{15}\Omega$ such that the static electricity is likely to be accumulated on the surface of Polyethylene Terephthalate (PET) and not easy to vent, and the ductility is 22%. Therefore, the copolyester material with peptide in the present has better hydrophilicity, antistaticity and ductility than conventional Polyethylene Terephthalate (PET). Accordingly, the copolyester material with peptide produced by the method according to the present invention can be processed into products with better properties if properly processed.

Please note that the above embodiment is just preferred embodiment of the present invention and are not intended to limit the scope of the present invention. It is understandable to those skilled in the art that the abovementioned elements are not all essential elements. Further, in order to implement the present invention, other detailed known elements might be included as well. Each element can be omitted or modified according to different needs.

What is claimed is:

1. A method of producing copolyester material with peptide, comprising:

putting ethylene glycol (EG), collagen peptide, and benzenedicarboxylic acid into a container, and mixing the ethylene glycol, the collagen peptide, and the benzenedicarboxylic acid to form a mixture, wherein in the mixture, a molar ratio of the collagen peptide, the ethylene glycol, and the benzenedicarboxylic acid is (0.47-0.60): (0.90-1.10): (1.14-1.26); heating the mixture for executing an esterification reaction, to produce esters and water;

heating the esters to a first temperature, and stirring the esters via a mixer;

in a specific period, decreasing a pressure in the container to a first pressure for executing a polycondensation reaction; and decreasing the pressure in the container to a second pressure, and stirring the esters via the mixer, to produce a copolyester material with peptide.

2. The method of producing copolyester material with peptide as claimed in claim 1, further comprising:

adding a catalyst to the container.

3. The method of producing copolyester material with peptide as claimed in claim 2, further comprising:

introducing nitrogen into the container.

4. The method of producing copolyester material with peptide as claimed in claim 3, further comprising:

stirring the mixture via the mixer.

5. The method of producing copolyester material with peptide as claimed in claim 4, wherein the step of heating the mixture for executing an esterification reaction to produce esters and water further comprising:

removing water from the container.

6. The method of producing copolyester material with peptide as claimed in claim 5, further comprising:

when a torque detected by the mixer exceeds a specific torque value, the heating and stirring are stopped and the pressure in the container is increased by the second pressure.

7. The method of producing copolyester material with peptide as claimed in claim 6, wherein the benzenedicarboxylic acid is terephthalic acid (TPA) or isophthalic acid (IPA), or a combination of TPA and IPA.

8. The method of producing copolyester material with peptide as claimed in claim 7, wherein if the benzenedicarboxylic acid is a combination of is terephthalic acid (TPA) and isophthalic acid (IPA), a molar ratio of TPA and IPA is (1.08-1.14): (0.06-0.12).

9. The method of producing copolyester material with peptide as claimed in claim 8, wherein the catalyst is a combination of $Sb_2O_3$ and $TiO_2$.

10. The method of producing copolyester material with peptide as claimed in claim 9, wherein a ratio range of PPM concentration between $Sb_2O_3$ and $TiO_2$ in the catalyst is (160-360): ($\geq$0-60).

11. The method of producing copolyester material with peptide as claimed in claim 10, wherein the temperature at which the mixture is heated for executing the esterification reaction ranges from 210° C. to 270° C.

12. The method of producing copolyester material with peptide as claimed in claim 11, wherein the first temperature ranges from 260° C. to 280° C.

13. The method of producing copolyester material with peptide as claimed in claim 12, wherein the second temperature ranges from 270° C. to 290° C.

14. The method of producing copolyester material with peptide as claimed in claim 13, wherein a speed of the mixer stirring the mixture ranges from 180 RPM to 220 RPM.

15. The method of producing copolyester material with peptide as claimed in claim 14, wherein when the esters are heated to the first temperature, a speed of the mixer stirring the esters ranges from 130 RPM to 170 RPM.

16. The method of producing copolyester material with peptide as claimed in claim 15, wherein when the pressure in the container is decreased to the second pressure, and the ester is heated to the second temperature, a speed of the mixer stirring the esters ranges from 80 RPM to 120 RPM.

17. The method of producing copolyester material with peptide as claimed in claim 16, wherein the specific time ranges from 20 min to 40 min.

* * * * *